United States Patent [19]

Childre

[11] Patent Number: 4,916,848

[45] Date of Patent: Apr. 17, 1990

[54] HANDLE BODY ASSEMBLY FOR A FISHING ROD

[75] Inventor: Casey J. Childre, Foley, Ala.

[73] Assignee: Lew Childre & Sons, Inc., Foley, Ala.

[21] Appl. No.: 301,235

[22] Filed: Jan. 24, 1989

[51] Int. Cl.$^4$ .............................................. A01K 87/02
[52] U.S. Cl. ......................................... 43/23; 43/20; 43/22
[58] Field of Search ...................... 43/18.1, 23, 20, 22

[56] References Cited

U.S. PATENT DOCUMENTS

| 1,033,668 | 7/1912 | Brunnett | 43/18.1 |
| 3,197,908 | 8/1965 | Hirsch | 43/23 |
| 4,516,351 | 5/1985 | Highby | 43/18.1 |
| 4,646,462 | 3/1987 | Ohmura | 43/23 |

OTHER PUBLICATIONS

Johnny Morris Bass Pro Shops 1986 Catalog; p. 53, rods A and B; p. 84, Tournament XL Casting Handle.
Johnny Morris Bass Pro Shops 1989 Catalog; p. 105, Casting Rod.
Gender Mountain, Inc. Special Edition Spring-Summer Catalog 86 E; p. 8, rods B and D.

Primary Examiner—Richard K. Seidel
Assistant Examiner—James Miner
Attorney, Agent, or Firm—Lockwood, Alex, Fitzgibbon & Cummings

[57] ABSTRACT

An improved fishing rod of the through rod construction type is disclosed. The rod includes a handle grip, handle body and a transition collar interposed therebetween and a rod blank received therethrough. The transition collar provides a smooth transition from the handle body to the grip. Additionally, the transition collar provides a means of offsetting the grip relative to the rod blank.

9 Claims, 3 Drawing Sheets

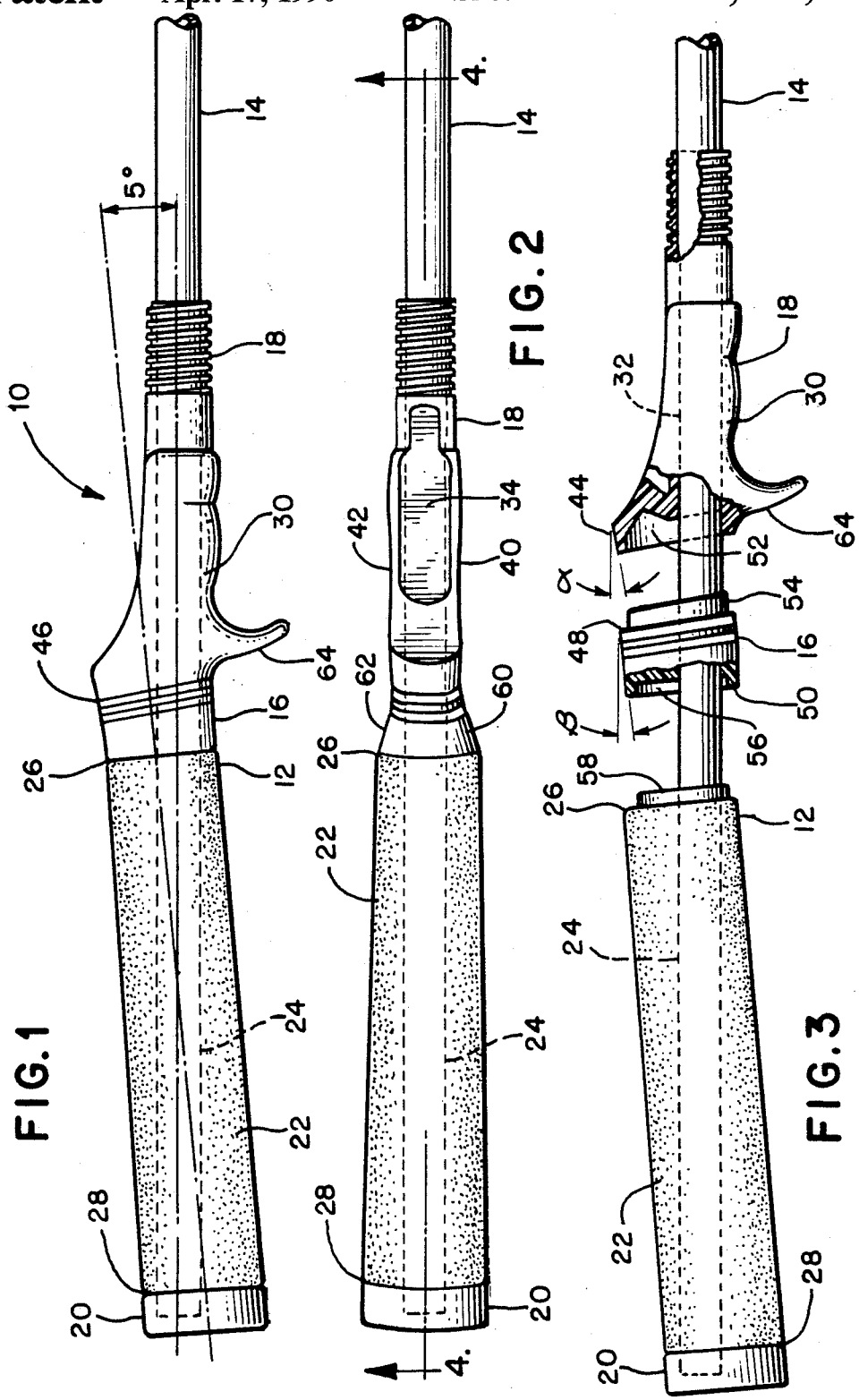

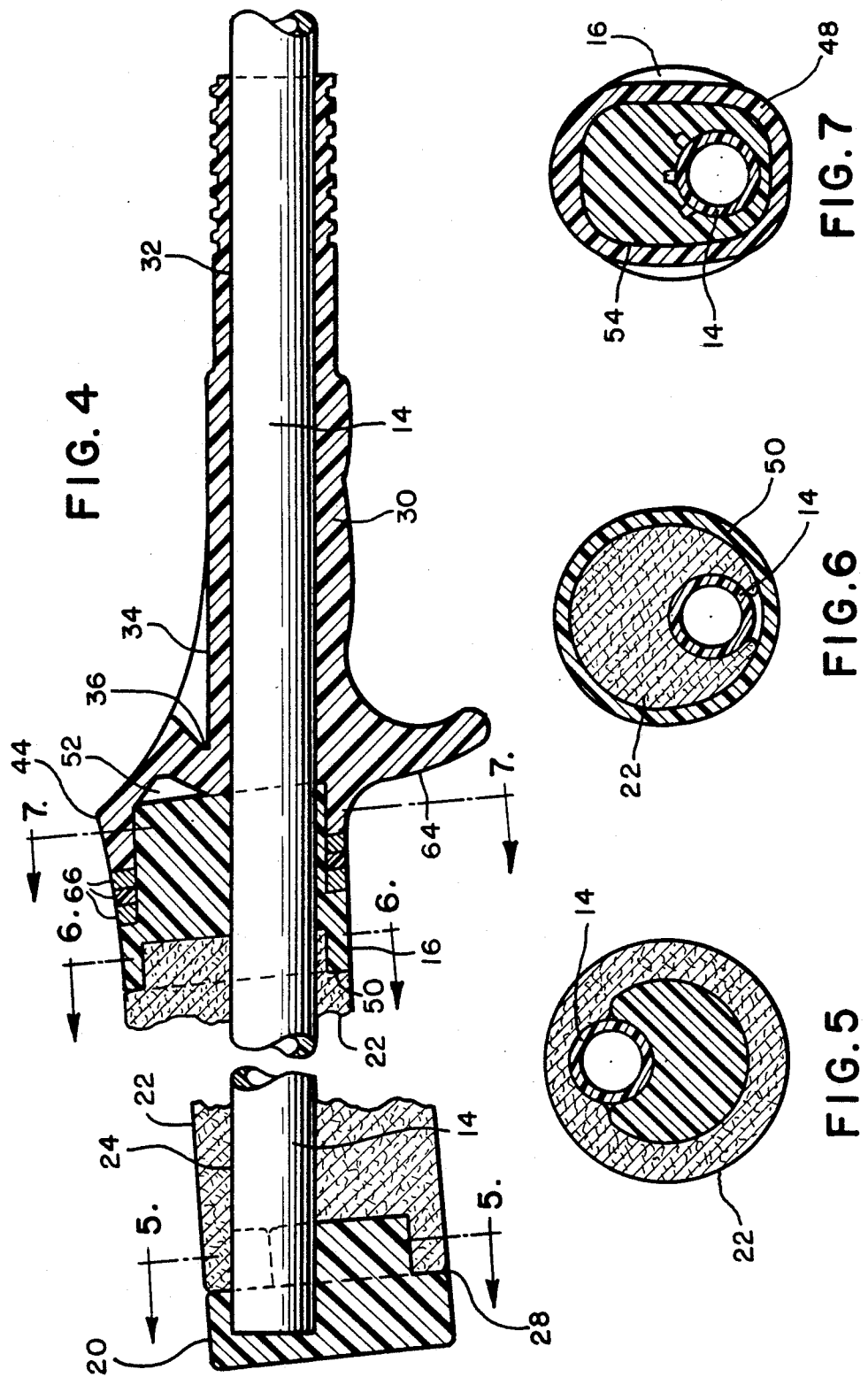

HANDLE BODY ASSEMBLY FOR A FISHING ROD

BACKGROUND AND SUMMARY OF THE INVENTION

The present invention generally relates to handles for fishing rods and, more particularly, to an improved handle for a fishing rod of the through rod construction type using a standard reel seat body. In this regard, an important aspect of the present invention concerns a unique fishing rod transition collar which provides a smooth transition from a rod reel seat body to a rod handle grip assembly.

Fishermen have long realized the importance of "feel" between line, rod and reel during the cast and during the retrieve. One means of achieving better "feel" and comfort to fishermen has been to provide a fishing rod with a handle which is offset from the axis of the rod blank. Such an offset handle allows a fisherman to posture his hand so as to achieve greater accuracy during cast with minimal discomfort. In rods of the non-bland-through design, wherein the rod blank does not travel through the handle, offset handles of various lengths can easily be provided. Such offset handles, however, must be made strong enough to withstand wear and tear and the applied forces during cast, retrieve and normal use. Accordingly, such offset handles typically tend to be relatively heavy.

Experienced fishermen have noted the advantages of fishing rods of the so-called through rod construction type, that is, those rods which enable the full diameter rod blank to be inserted throughout the full length of a handle body. Fishing rods of the through rod construction type provide improved "feel" between line, rod and reel and reduce the overall weight of the rod by utilizing the inherent lightness and strength of the rod blank to augment the strength of the reel seat body and handle body on the rod. Custom rod makers had, long ago, adapted offset handles to rods of the blank-through handle construction type. In such offset handles, the blank travels through the handle at an angle. Accordingly, such offset handles must either balance the degree of offset and the length of the handle or be specially designed to prevent the blank from protruding through the aft grip.

Experienced fishermen have also come to realize that it is more comfortable to grip an oval or non-cylindrical handle than a cylindrical handle. Presently, handle makers are making handles by way of profile grinders which are used to shape each plane of dimension. This process is costly as each different plane must be shaped separately. The cost for producing an oval or other non-cylindrical handle is often two times or more the cost of producing tapered round cylindrical handles for the same length and mean diameter.

Just as fishermen have recognized that oval or non-cylindrical handles are more comfortable, they also have recognized that oval or non-cylindrical reel seat bodies are also more comfortable to grip than cylindrical reel seat bodies. In fact, as a greater portion of the casting hand rests on the handle body than on the grip during cast, it is important to provide a handle body which is comfortable to grip.

Presently, two different style component handle bodies for a blank through rod are available, namely, one to accommodate round handle grips and another one to accommodate non-cylindrical style handle grips. From a cost and comfort benefit analysis, it would be desirable to utilize a non-cylindrical handle body with a cylindrical grip but, presently, such a configuration does not provide a smooth transition or comfortable arrangement for the fisherman.

Furthermore, available component handle bodies for rods of the through rod construction type often have an aft fixed reel foot engaging member having a rearward raised portion thereon which is downwardly angled to allow the rod handle to be raised toward the center line of the reel and effect an offset handle. It is often desirable to decrease the angle which is molded into the rar of the handle body so as to allow the grip to have an increased axial length before the blank intersects the circumference of the grip in a blank through rod design.

The present invention overcomes the above-described disadvantages and limitations of heretofore known offset handle constructions of a through-rod type by providing an offset handle assembly which can accommodate handle bodies and grips of different configuration. The offset handle assembly of this invention includes a transition collar which is interposed between the handle body and the grip to provide smooth transition therebetween. The transition collar is characterized by a fore end cross sectional configuration adapted to match the aft cross sectional configuration of the handle body of oval shaped design and an aft cross sectional configuration adapted to match the fore end cross sectional configuration of the cylindrical (round) shaped grip. The transition collar has a graduated configuration between its two ends to provide a smooth transition between the handle body and the grip. The transition collar may be also configured to change the slope of an offset handle body from that which would be obtained from a direct connection of the handle grip to the reel seat body.

It is, therefore, an object of the present invention to provide an improved fishing rod of the blank-through construction type.

Another object of the present invention is to provide a fishing rod transition collar which allows a smooth transition from a non-cylindrical handle body to a cylindrical grip.

Another object of the present invention is to provide a transition collar which modifies the slope of the offset grip.

Another object of the present invention is to provide an offset handle for a fishing rod of the through rod construction type which is characterized by a streamlined appearance and is free of any awkward protrusions.

These and other objects features and advantages of the present invention wil be clearly understood through consideration of the following detiled description.

BRIEF DESCRIPTION OF THE DRAWINGS

The invention, together with the further advantages thereof, can best be understood by reference to the following description, taken in conjunction with the accompanying drawings in which like reference numerals identified like elements and in which:

FIG. 1 is a side elevational view of a fishing rod shown with partial rod blank which fishing rod includes a handle body, an aft grip, and a transition collar embodying the present invention;

FIG. 2 is a plan view of the fishing rod shown in FIG. 1;

FIG. 3 is a exploded side elevational view of the fishing rod shown in FIG. 1 with portions of the rod assembly cut away;

FIG. 4 is a fragmented cross sectional view taken along line 4—4 of FIG. 2;

FIG. 5 is a vertical sectional view taken along line 5—5 of FIG. 4;

FIG. 6 is a vertical sectional view taken along line 6—6 of FIG.4;

FIG. 7 is a vertical sectional view taken along line 7—7 of FIG. 4; and,

DETAILED DESCRIPTION OF THE INVENTION

Figure 8:
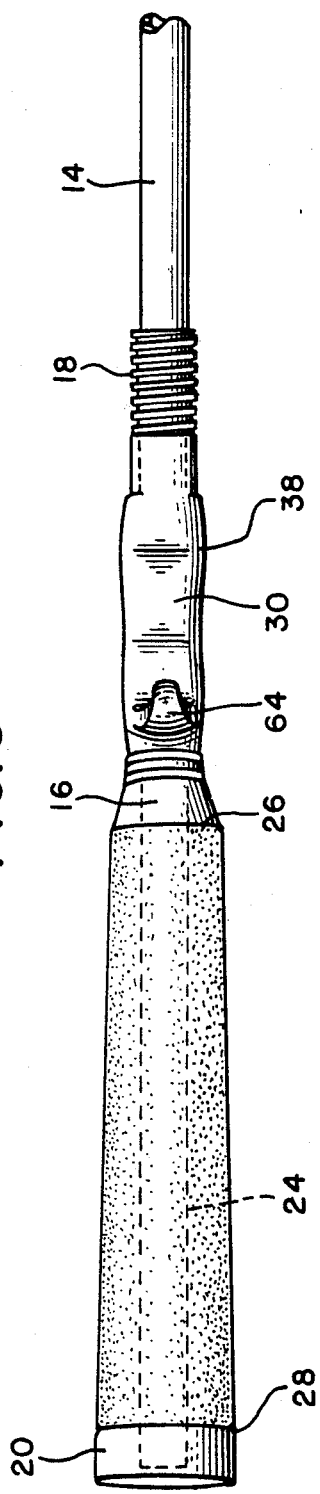
FIG. 8 is a bottom plan view of the fishing rod shown in FIG. 1.

Referring to the drawings, and with particular reference to FIGS. 1-2, reference numeral 10 generally designates a fishing rod having a handle grip assembly 12 from which a rod blank 14 axially extends. As best shown in FIG. 3, in addition to handle assembly 12, fishing rod 10 also includes a transition collar 16 and a handle body assembly 18.

The handle assembly 12 includes an end cap 20 and a grip 22. The grip 22 is a generally elongated hollow body having an axial passage 24 which receives the rod blank 14 substantially throughout the entire body thereof. Grip 22 may take the form of any desired configuration. Grip 22 has a fore end 26 and an aft end 28. As shown in FIGS. 1-3, grip 22 has a cylindrical configuration which is tapered from aft end 28 to fore end 26.

As best shown in FIG. 4, handle assembly 18 includes a generally elongated hollow handle body 30 having an axial passage 32 through which the rod blank 14 extends. Handle body 30 further includes a reel seat portion 34 and an aft fixed reel-foot engaging member 36 to receive a rearwardly extending flange of a reel (not shown) mounted to the reel seat portion 34. Handle body assembly 18 also includes an axially slidable movable reel-foot engaging member (not shown) adapted to receive the forward extending flange of a reel mounted to said reel seat portion 34.

As best shown in FIGS. 1, 2 and 8, handle body 30 preferably has a noncircular configuration and more preferably has an oval configuration. In this regard, the bottom 38 of reel seat body 30 is rounded and preferably has undulations for finger comfort. Also in this regard, opposing sides 40 and 42, respectively, of reel seat body 30 are substantially flat. The reel seat body 30, further includes a raised portion 44 above the aft reel seat engaging member 36. As best shown in FIG. 3, the raised portion 44 is angled downwardly from fore to aft at an angle α. Typically, angle α is approximately 7°. The reel seat body raised portion 44 terminates at the aft end of reel seat body 46. Preferably, the aft end 46 has a cross sectional configuration generally resembling an oval.

As best shown in FIGS. 6-7, the fore end 48 of transition collar 16 has substantially the same cross sectional configuration as the cross sectional configuration of the aft end 46 of handle body 30, and the fore end 48 is configured to mate with the aft end 46 so as to effect a smooth transition from the handle body 30 to the transition collar 16. The aft end 50 of transition collar 16 preferably has substantially the same cross sectional configuration as the cross sectional configuration of the fore end 26 of grip 22 and aft end 50 is configured to mate with the fore end 26 so as to effect a smooth transition from the transition collar 16 to the grip 22.

As best shown in FIGS. 1, 3 and 4, handle body 30 may also include a finger hook 64. Preferably the axial length of the bottom portion of transition collar 16 is dimensioned so that the distance between the aft end 50 and finger hook 64 is sufficient to support at least a portion of a fisherman's finger during casting.

As best shown in FIGS. 2 and 7, the transition collar 16 also has a graduated shape from its fore end 48 to its aft end 50 to effect a smooth transition therebetween. This graduated shape is preferably achieved by flaring out opposing sides 60 and 62, respectively, of transition collar 16. More preferably, flared opposing sides 60 and 62 are contoured to present a non-cylindrical feel when grasped by the fisherman during casting and retrieval. Most preferably, flared opposing sides 60 and 62 are contoured to achieve a feel of flatness when grasped by a fisherman during casting and retrieval.

As best shown in FIGS. 3-4, the aft end 46 of handle body 30 preferably has a receiving channel portion 52 to receive a forward portion 54 of transition collar 16 to effect indexing and registration of same. Similarly, transition collar 16 preferably has an aft receiving channel portion 56 for receiving a forward portion 58 of grip 22 so as to effect indexing and registration of same.

As best shown in FIGS. 1, 3 and 4, axial passage 24 of grip 22 is angled downwardly from the aft end 28 to the fore end 26 of grip 22 to offset the central axis of handle grip 22 from the central axis of rod blank 14. It will be appreciated that the degree to which passage 24 is angled will effect the point at which the blank 14 will protrude through the outer perimeter of handle grip 22 and therefore affect the length of grip 22. It may also be desirable that passage 24 be straight with no angle in relation to handle body 30 thereby creating an offset effect only in the transition collar area and allowing straight grips 22 to be used with a centered bore thereon.

Transition collar 16 is preferably downwardly angled from fore to aft at angle β. More preferably, the angle β is less than angle α. By making angle β of transition collar 16 less than angle α of raised portion 44, the axial length of grip 22 can be increased from the axial length which would be achieved if grip 22 mated smoothly and directly with handle body 30 at angle α before rod blank 14 protrudes through the circumference of handle grip 22. Optionally, transition collar 16 can have ornamental annular rings if desired.

It will be apparent to those skilled in the art that the present invention can be embodied in various forms and that, accordingly, the invention is to be construed and limited only by the scope of the appended claims.

What is claimed is:

1. A fishing rod of the through rod construction type comprising a grip, a handle body, and a rod blank axially extending from the grip through the handle body;

said grip being a generally elongated hollow body adapted to axially receive the rod blank substantially throughout the entire body thereof;

said grip having a fore end and an aft end, said grip fore end having a preselected exterior shape, preselected exterior dimensions and a preselected first angular orientation to the rod;

said handle body also being a generally elongated hollow body adapted to axially receive the rod blank throughout the entire body thereof;

said handle body having a fore end and an aft end, said handle body aft end having a preselected exterior shape, preselected exterior dimensions and a preselected second angular orientation to the rod;

said first angular orientation and said second angular orientation being different;

said handle body being positioned fore of said grip along said rod blank;

said fishing rod further including a transition collar having a bore through which said rod blank is received, said transition collar being interposed between said handle body and the said grip;

said transition collar having a fore end exterior shape and exterior dimensions substantially equivalent to the preselected exterior shape and exterior dimensions of said handle body aft end;

said transition collar having an aft end exterior shape and exterior dimensions substantially equivalent to the preselected exterior shape and exterior dimensions of said grip fore end;

said transition collar having top, bottom and side portions; and said transition collar having a graduated shape and graduated exterior dimensions which provide a smooth transition between said handle body and said grip.

2. The fishing rod of claim 1 wherein the exterior shape of said grip fore end and the exterior shape of said handle body aft end are different.

3. The fishing rod of claim 2 wherein the exterior shape of said grip fore end is generally circular and the exterior shape of said handle body aft end is generally oval.

4. The fishing rod of claim 1 wherein said handle body comprises a reel seat portion and an aft fixed reel-foot engaging member adapted to receive a rearwardly extending flange of a reel mounted to said reel seat portion.

5. The fishing rod of claim 4 wherein the aft end of said handle body further includes a raised portion aft of and relative to said reel seat portion, said raised portion being angled downwardly from fore to aft, the aft end of said raised portion abuttingly engaging the transition collar fore end;

the top portion of said transition collar being angled downwardly from fore to aft; and, the downward angle of said handle body raised portion being greater than the downward angle of said transition collar top portion.

6. The fishing rod of claim 4 wherein the bottom of said handle body further comprises a finger hook; and, said transition collar is dimensioned to have a bottom axial length such that the combined axial distance from the aft side of said finger hook to the aft most end of said transition collar is sufficient to support at least a portion of a fisherman's finger.

7. The fishing rod of claim 6 wherein said transition collar is contoured to have a generally non-cylindrical extension surface for grasping during casting and retrieval.

8. The fishing rod of claim 7 wherein said transition collar is contoured to have a generally flattened extension surface for grasping during casting and retrieval.

9. The fishing rod of claim 1 wherein said transition collar has means for registering with said reel seat body and means for registering with said grip.

* * * * *